US011105713B2

(12) United States Patent
Nakauchi et al.

(10) Patent No.: US 11,105,713 B2
(45) Date of Patent: Aug. 31, 2021

(54) ENGINE TESTING DEVICE

(71) Applicant: Hirata Corporation, Kumamoto (JP)

(72) Inventors: Tsutomu Nakauchi, Kumamoto (JP); Keisuke Teramoto, Kumamoto (JP); Kosei Kino, Kumamoto (JP); Hisayuki Sueoka, Kumamoto (JP)

(73) Assignee: Hirata Corporation, Kumamoto (JP)

( * ) Notice: Subject to any disclaimer, the term of this patent is extended or adjusted under 35 U.S.C. 154(b) by 633 days.

(21) Appl. No.: 16/071,837

(22) PCT Filed: Mar. 31, 2017

(86) PCT No.: PCT/JP2017/013814
§ 371 (c)(1),
(2) Date: Jul. 20, 2018

(87) PCT Pub. No.: WO2018/179416
PCT Pub. Date: Oct. 4, 2018

(65) Prior Publication Data
US 2021/0199537 A1    Jul. 1, 2021

(51) Int. Cl.
*G01M 15/02*    (2006.01)
*G01M 15/04*    (2006.01)

(52) U.S. Cl.
CPC .......... *G01M 15/042* (2013.01); *G01M 15/02* (2013.01)

(58) Field of Classification Search
CPC ..................... G01M 15/02; G01M 15/042
See application file for complete search history.

(56) References Cited

U.S. PATENT DOCUMENTS

| 4,594,882 A | 6/1986 | Wheeler |
| 5,417,109 A * | 5/1995 | Scourtes ............... G01M 15/09 |
| | | 73/114.01 |
| 2007/0157714 A1 | 7/2007 | Rankin et al. |
| (Continued) | | |

FOREIGN PATENT DOCUMENTS

| CN | 201724787 U | 1/2011 |
| CN | 202216815 U | 5/2012 |
| (Continued) | | |

OTHER PUBLICATIONS

International Search Report and Written Opinion dated Jun. 6, 2017 for Application No. PCT/JP2017/013814 filed on Mar. 31, 2017, consisting of 6-pages.
(Continued)

*Primary Examiner* — Eric S. McCall
(74) *Attorney, Agent, or Firm* — Christopher & Weisberg, P.A.

(57) ABSTRACT

An engine testing device including a plurality of seal head units movable forward and backward relative to the intake ports and the exhaust ports. Each of the seal head units includes a plurality of seal heads disposed side by side and are connectable to respective ports of the intake ports and the exhaust ports. A pitch-varying unit changes interval pitches between the seal heads of at least one of the seal head units. The pitch-varying unit includes a plurality of first movement mechanisms connected with the seal heads and movable in a direction across the seal heads disposed side by side, and a plurality of drivers to drive the first movement mechanisms.

15 Claims, 13 Drawing Sheets

(56) References Cited

U.S. PATENT DOCUMENTS

2015/0177092 A1* 6/2015 Parker .................. G01M 3/022
73/40.7
2015/0276551 A1* 10/2015 Sueoka ................ G01M 15/05
73/114.37

FOREIGN PATENT DOCUMENTS

| | | |
|---|---|---|
| CN | 203030866 U | 7/2013 |
| CN | 103308315 A | 9/2013 |
| CN | 103364193 A | 10/2013 |
| CN | 104949837 A | 9/2015 |
| JP | 5475682 | 6/1979 |
| JP | 2001200769 A | 7/2001 |
| JP | 2004257779 A | 9/2004 |
| JP | 2010276515 A | 12/2010 |
| JP | 2015190797 A | 11/2015 |
| KR | 100369860 | 1/2003 |

OTHER PUBLICATIONS

Korean Intellectual Property Office Opinion Submission Notice and English Translation dated Apr. 29, 2019 for Application No. 10-2018-7015995, consisting of 8-pages.
Chinese First Notice of Refusal and English Translation dated Sep. 27, 2019 for Application No. 201780004238.3, consisting of 15-pages.

* cited by examiner (A)

(B)

(C)

(A)

(B)

(C)

ENGINE TESTING DEVICE

CROSS-REFERENCE TO RELATED APPLICATIONS

This application is a Submission Under 35 U.S.C. § 371 for U.S. National Stage Patent Application of International Application Number: PCT/JP2017/013814, filed Mar. 31, 2017 entitled "ENGINE TESTING DEVICE," the entirety of which is incorporated herein by reference.

TECHNICAL FIELD

The present invention relates to engine testing devices. In particular, the present invention relates to an engine testing device that can be applied to multiple types of engines.

BACKGROUND ART

There has been a proposal of an engine motoring test device for engines, configured to test a multi-cylinder engine including a plurality of ports including intake ports and exhaust ports in a pseudo driving state in which the engine is driven by an electric motor with no combustion of fuel (e.g., Patent Document 1). Such an engine testing device is designed for testing the performance of engines in a cold test. The device can measure values in various operational states simultaneously during a motoring test of engines and can test the performance of engines automatically and with precision on an automated assembly line of engines.

According to a configuration of the above-described engine motoring test device, an engine is carried into and fixed at the test position and a ring gear directly fixed to the crank shaft of the engine is engaged with a plurality of coupling fingers, enabling reliable rotation of the engine at the same number of rotations as that of the electrical motor and reducing the time for preparation for the motoring test.

Further, there has been a proposal of a motoring test device for engines, in particular, to realize automation of the opening/closing of the valves of the pressure inspection unit for carrying out pressure tests of engines (e.g., Patent Document 2). Such a testing device includes: a plurality of pressure inspection units; and at least one opening/closing mechanism, wherein each of the plurality of pressure inspection units includes: a pipeline connected to one of a plurality of ports; a sensor for detecting a pressure in the pipeline; and a valve for opening/closing the pipeline, wherein the opening/closing mechanism includes: one actuator; and a transmission mechanism connected to the actuator and transmitting the driving force of the actuator to an operation unit of each of the plurality of valves to open and close the plurality of valves. According to such a configuration, the testing device allows automation of the opening/closing of the valves and reduction of the pipeline length, thereby improving the precision in measuring pressure fluctuations.

PRIOR ART REFERENCES

Patent Documents

Patent Document 1: WO 2005/057159 A1
Patent Document 2: Japanese Laid-Open Patent Application Publication No. 2015-190797

SUMMARY OF THE INVENTION

Problems to be Solved by the Invention

However, the conventional engine testing devices (also referred to as cold testers, hereinafter) described in Patent Document 1 and other documents are adapted to test the engines having particular specifications and little consideration has been given to the application of the devices to multiple types of engines.

Engines to be tested by an engine testing device have particular design specifications according to their types, for the positions of the intake ports/exhausts ports, the pitches between the intake ports/exhaust ports, the orientations of the openings of the intake ports/exhaust ports (inclination angles), the number of cylinders, and the like.

FIG. 13 illustrates, in conceptual diagrams, structures of multiple types of engines to be tested. FIG. 13 (A) and FIG. 13 (C) illustrates, in a plan view, structures of multiple types of engines to be tested by the engine testing device. FIG. 13 (B) illustrates, in a partial cross sectional view, cross sections of multiple types of engines to be tested by the engine testing device.

As illustrated in FIG. 13 (A), multiple types of engines 130 to be tested have the openings of the intake ports 130a and the exhaust ports 130b defined in different positions and have the intake ports 130a and the exhaust ports 130b disposed at different interval pitches p, although both having four cylinders. Further, as illustrated in in FIG. 13 (B), the multiple types of engines 130 to be tested have exhaust ports 130b extending inside the engines 130 in various directions, i.e., downward, horizontally, and upward. Further, the multiple types of engines 130 to be tested have the openings of the exhaust ports 130b in different orientations (inclination angles). Further, as illustrated in FIG. 13 (C), the multiple types of engines 130 to be tested may have different numbers of cylinders, i.e., may be three-cylinder engines, four-cylinder engines, six-cylinder engines, and other multi-cylinder engines.

As described above, the conventional engine testing devices are each adapted to the design specification of one type of engines to be tested. Therefore, each conventional engine testing device can only test one type of engines to be tested and different types of testing devices that fit the types of engines need to be used.

An object of the present invention is, therefore, to provide an engine testing device configured to test engines to be tested even when the engines have the openings of the intake ports and the exhaust ports defined in different positions, the intake ports and the exhaust ports disposed at different interval pitches p, or other differences. Another object of the present invention is to provide an engine testing device configured to test engines to be tested even when the engines have the openings of the intake ports/exhaust ports in different orientations (inclination angles), a different number of cylinders, or other differences.

Means for Solving the Problems

After ardent research, the inventors of the present invention have found that, by providing a plurality of seal head units movable forward and backward relative to the intake ports and the exhaust ports and connectable to respective ports of the intake ports and the exhaust ports, wherein each of the seal head units has a plurality of seal heads disposed side by side, and a pitch-varying unit to change interval pitches between the seal heads of the seal head units, wherein the pitch-varying unit includes a plurality of first movement mechanisms connected with the seal heads and movable in a direction across the seal heads disposed side by side and a plurality of drivers to drive the first movement mechanisms, the interval pitches between the seal heads can be changed, which has led to the accomplishment of the present invention. More specifically, the present invention includes the following technical matters.

(1) An engine testing device configured to test an engine with a plurality of ports including intake ports and exhaust ports in a pseudo driving state, the device comprising:

a plurality of seal head units movable forward and backward relative to the intake ports and the exhaust ports of the engine, wherein each of the seal head units includes a plurality of seal heads disposed side by side and connectable to respective ports of the intake ports and the exhaust ports; and at least one pitch-varying unit for at least one of the seal head units, to change interval pitches between each adjacent pair of the seal heads of the seal head unit, wherein the at least one pitch-varying unit includes:

a plurality of first movement mechanisms respectively connected with the seal heads and movable in a direction in which the seal heads are disposed side by side; and a plurality of drivers to respectively drive the first movement mechanisms.

(2) The engine testing device according to (1), further including a control unit to control forward and backward movements of the plurality of seal head units and a driving operation by each of the drivers of the at least one pitch-varying unit.

(3) The engine testing device according to (1) or (2), further including at least one tilt unit for tiltably supporting at least one of the seal head units, wherein the at least one tilt unit includes: a frame swingably supporting the seal head unit; and a tilt actuator provided on the frame to tilt the seal head unit relative to the frame.

(4) The engine testing device according to any one of (1) to (3), further including second movement mechanisms respectively provided for the seal heads of at least one of the seal head units to respectively support the seal heads in such a manner as to enable the seal heads to move forward and backward.

(5) The engine testing device according to any one of (1) to (4), wherein the first movement mechanisms include ball nuts and threaded shafts, wherein each of the seal heads is connected one of the ball nuts, wherein each of the ball nuts engages with one of the threaded shafts, and wherein each of the threaded shafts is connected with one of the drivers and the drivers rotate the threaded shafts.

Effects of the Invention

According to the present invention, an engine testing device configured to test multiple types of engines is provided. In other words, the engine testing device according to the present invention includes a plurality of seal heads to be respectively connected to the intake ports/exhaust ports and further includes a pitch-varying unit to change interval pitches between the seal heads, and therefore can be flexibly applied to multiple types of engines regardless of the interval pitches between the intake ports/exhaust ports of the engines to be tested.

Further, the engine testing device according to the present invention includes a tilt unit to tiltably support the seal heads as a whole and therefore can be applied to multiple types of engines regardless of the orientations of the openings of intake ports/exhaust ports (inclination angles) of the engines to be tested. Further, the engine testing device according to the present invention includes an elevator unit to change the vertical positions of the seal head units and therefore can be applied to multiple types of engines regardless of the vertical positions of the intake ports/exhaust ports of the engines to be tested.

BRIEF DESCRIPTION OF DRAWINGS

FIG. 7A, FIG. 7B, and FIG. 7C, respectively illustrate the tilt unit driven upward, horizontally, and downward in a left side view.

MODE FOR CARRYING OUT THE INVENTION

Embodiment 1

Figure 14:
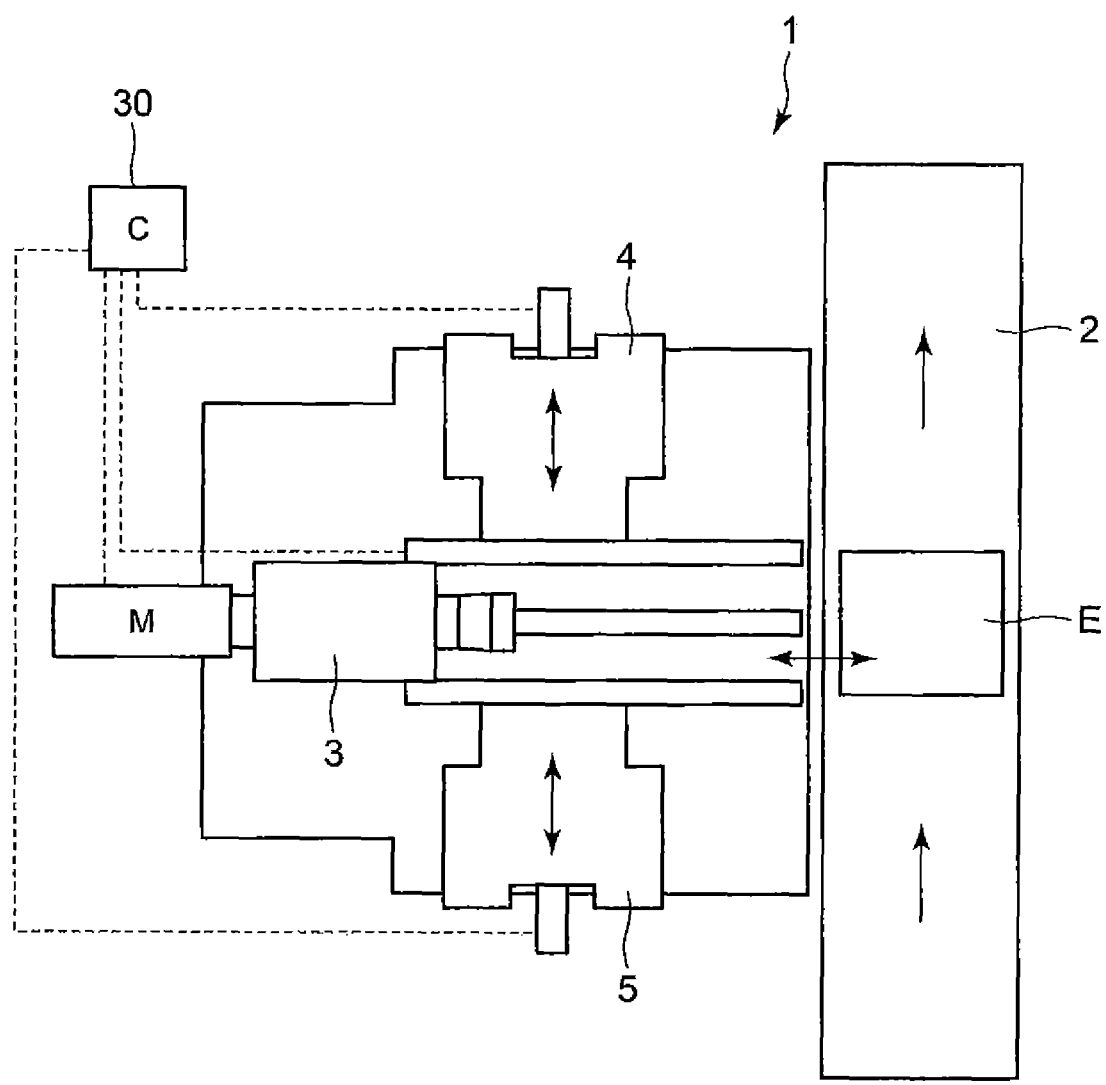
FIG. 14 is a plan view illustrating the entire engine testing device (cold tester).

Embodiments of the present invention will be described below. FIG. 14 is a plan view (top view) illustrating the entire engine testing device (cold tester). As illustrated in FIG. 14, the engine testing device 1 takes in an engine E conveyed by a conveyer device 2, which may be a roller conveyer or the like, to conduct a test on the engine E. The crank shaft of the engine E thus taken in is coupled with the drive unit 3, to couple the engine E with the drive unit 3.

The engine testing device 1 tests the engine E. The test conducted by the engine testing device 1 on the engine E is a test of the performance of the engine E to be tested, conducted in a pseudo driving state with no combustion of fuel, i.e., a so-called cold test. The engine testing device 1 tests the performance of the engine E by measuring pressure fluctuations in the intake ports of the engine E and by measuring pressure fluctuations in the exhaust ports of the engine E. The engine testing device 1 returns the engine E that it has taken in to the conveyer device 2 after completing the test of the engine E. The engine E is then conveyed to the next process by the conveyer device 2.

The engine testing device 1 measures pressure fluctuations in the intake ports and the exhaust ports of the engine E. With reference to FIG. 14, the pressure fluctuations of the intake ports of the engine E are measured by an intake testing device 4 and the pressure fluctuations in the exhaust ports of the engine E are measured by an exhaust testing device 5. The technical features of the engine testing device of the present invention are present in the intake testing device 4 and the exhaust testing device 5. The intake testing device 4 and the exhaust testing device 5 may be of very similar structures. In regard to the engine testing device 1 according to the embodiment 1, therefore, the structure of the intake testing device 4 will be mainly described.

(Seal Head Unit 10)

Figure 1:
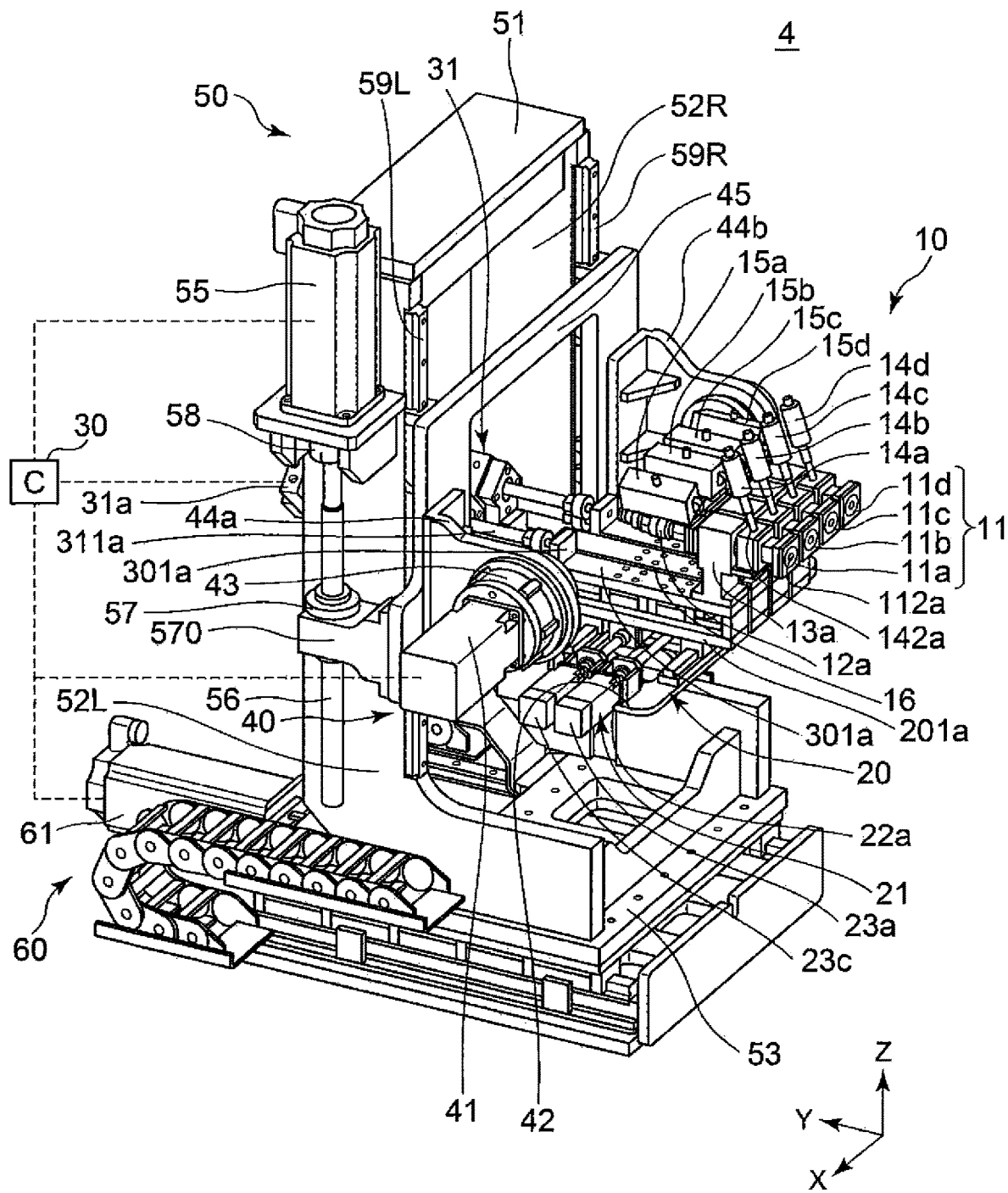
FIG. 1 is a perspective view illustrating the structure of the intake testing device of the engine testing device.

FIG. 1 is a perspective view illustrating the structure of the intake testing device 4 included in the engine testing device 1 according to the embodiment 1. The intake testing device 4 includes a seal head unit 10. The seal head unit 10 is a unit movable forward and backward relative to the intake ports of the engine E that includes a plurality of ports including intake ports. The seal head unit 10 has seal heads 11 connectable to respective ports including the above-mentioned intake ports. The seal head unit 10 includes a plurality of seal heads 11 (11a to 11d). The plurality of seal heads 11 may be disposed side by side in the X-axis direction (horizontal direction) and may be disposed side by side in the Z-axis direction (vertical direction). In FIG. 1, the intake testing device 4 includes four seal heads 11, i.e., seal heads 11a, 11b, 11c, and 11d disposed side by side but the number of the seal heads is not limited thereto. The number of the seal heads 11 may be selected as appropriate to allow for the number of intake ports of the engine E to be tested.

The seal heads 11a, 11b, 11c, and 11d constituting the seal head unit 10 are disposed side by side in the X-axis direction (horizontal direction). The seal heads 11a, 11b, 11c, and 11d may have an identical structure or different structures. Further, each of the seal heads 11 may be provided with a seal member such as rubber on the periphery of its opening to ensure secure connection with the intake ports of the engine E and accurate measurement of the pressure fluctuations in the intake ports.

The seal heads 11 include intake pressure measurement units, each of which includes a pipe 12, a pressure sensor 14, and a valve 15. In other words, each of the seal heads 11a, 11b, 11c, and 11d is provided with an intake pressure measurement unit. The seal heads 11a, 11b, 11c, and 11d are communicatively connected with pipes 12a, 12b, 12c, and 12d, respectively (FIG. 1 illustrates 12a only). On the peripheral wall of each of the pipes 12 are disposed a pressure sensor 14 and a valve 15 in this order from the side closer to the intake ports of the engine E. On the pipes 12a, 12b, 12c, and 12d are disposed pressure sensors 14a, 14b, 14c, and 14d, respectively, and valves 15a, 15b, 15c, and 15d, respectively. The pressure sensor 14a may be provided on an attachment part 142a formed on the peripheral wall of the pipe 12a. Similarly, the pressure sensors 14b, 14c, and 14d may be provided on attachment parts 142b to 142d formed on the peripheral walls of the pipes 12b, 12c, and 12d.

The attachment part 142a is provided between the seal heads 11a and the valve 15a. The attachment part 142a is a through hole formed in the boss onto which the pressure sensor 14a is fastened with a screw or the like and communicating with the internal space of the pipe 12a. The pressure sensor 14a is a sensor for measuring the pressure fluctuations in the intake ports of the engine E and measures the pressure in the internal space of the pipe 12a. The pressure in the internal space of the pipe 12a is measured by a detection unit of the pressure sensor 14a.

The valves 15a to 15d have operation units. Activating the operation units of the valves 15a to 15d by a rotation or a sliding movement opens or closes section openings of the pipes 12a to 12d. When the valves 15a to 15d are opened, the intake ports of the engine E to be tested are in an open system and the intake ports communicate with the external air. When the valves 15a to 15d are closed, the intake ports of the engine E to be tested are in a closed system and the intake ports are isolated from the external air. To measure the pressure fluctuations in the intake ports of the engine E with the engine testing device 1, the drive unit 3 is activated while the valves 15a to 15d are closed and the valves of the exhaust testing device 5 (not illustrated) are opened, to place the engine E in a pseudo driving state. The pressure fluctuations in the intake ports of the engine E are then measured by the pressure sensors 14a to 14d.

(Pitch-Varying Unit)

Figure 2:
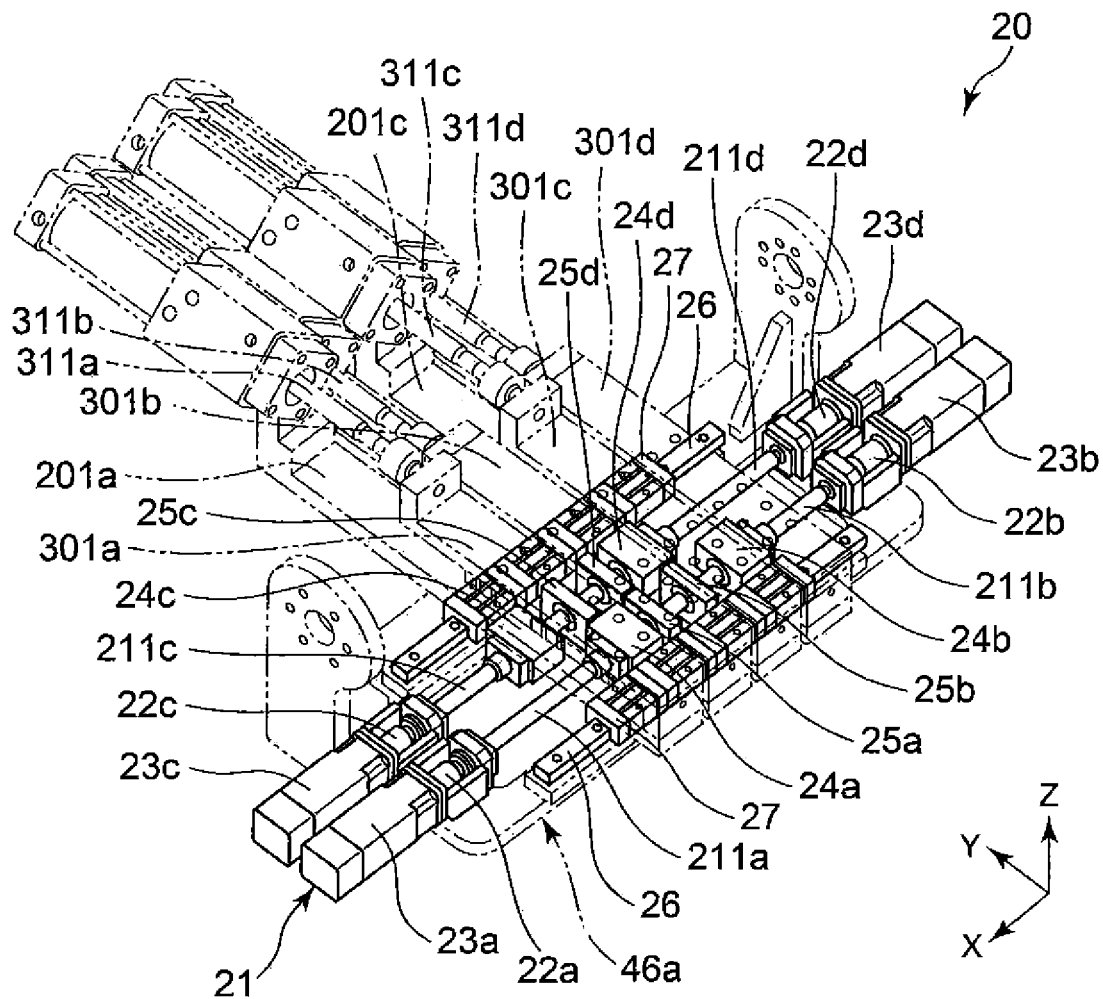
FIG. 2 is a perspective view illustrating the structure of the pitch-varying unit of FIG. 1.
Figure 3:
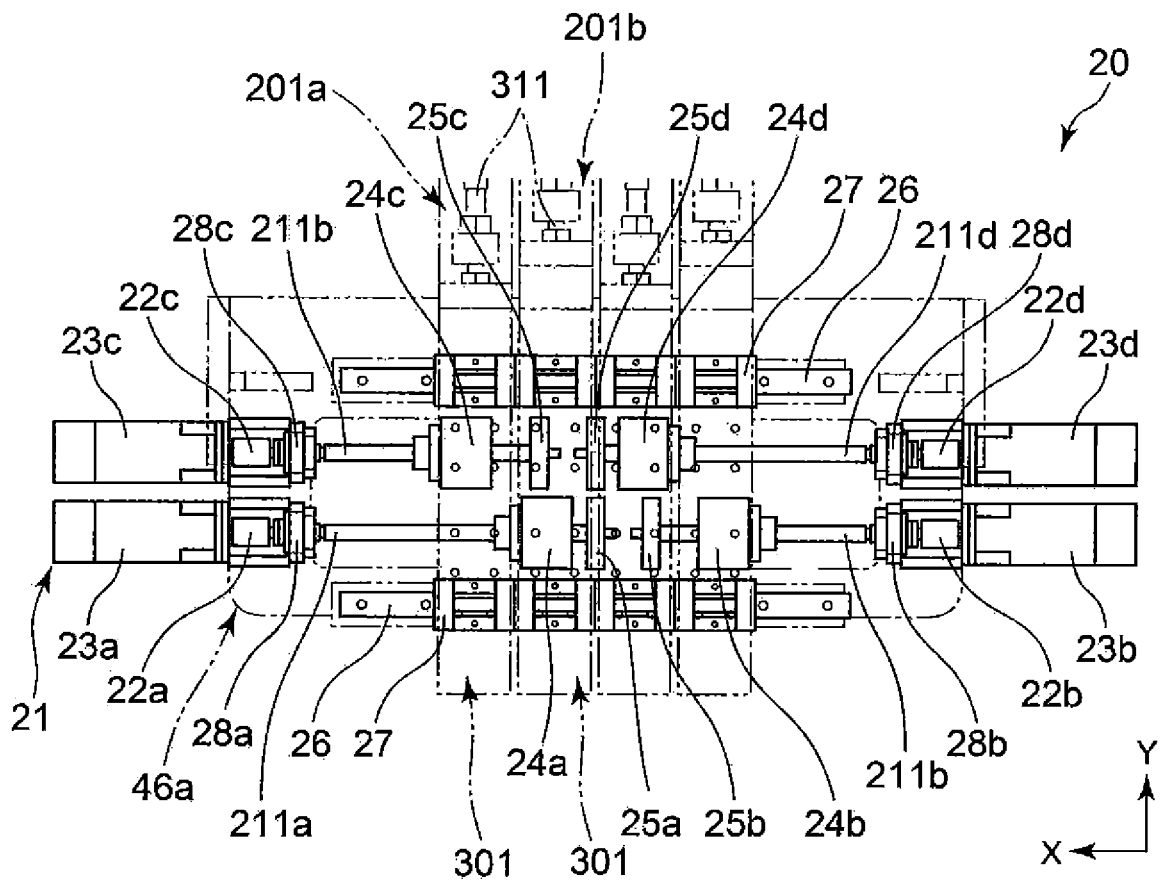
FIG. 3 is a top view illustrating the structure of the pitch-varying unit.

The intake testing device 4 included in the engine testing device 1 according to the present embodiment includes a pitch-varying unit 20 capable of changing the interval pitches between the seal heads 11 constituting the seal head unit 10. The interval pitches between the seal heads 11 are the spacing in the X-axis direction (horizontal direction) between the seal heads 11 disposed side by side in the X-axis direction and, for example, the spacing between each adjacent pair of the seal heads 11a to 11d. FIG. 2 is a perspective view illustrating the structure of the pitch-varying unit 20. FIG. 3 is a top view illustrating the structure of the pitch-varying unit 20.

(First Movement Mechanisms)

As illustrated in FIG. 2 and FIG. 3, the pitch-varying unit 20 works with the seal heads 11 constituting the seal head unit 10. For example, the pitch-varying unit 20 works with the four seal heads 11, and two pairs of first movement mechanisms 21 are disposed on a frame 42 in such a manner as to extend in the X-axis direction and to be opposite to each other. On the frame 42 are further disposed a pair of guide rails 26, 26 extending in the X-axis direction, the two pairs of the first movement mechanisms 21 interposed between the pair of guide rails 26, 26. On each guide rail 26 are provided at least four rail engagement members 27 that slide on the rails. Each of the first movement mechanisms 21 (21a to 21d) is disposed on the side closer to the intake ports of the engine E to be tested and includes a driver 23 (23a to 23d), a threaded shaft 211 (211a to 211d) connected with the driver 23 by means of a coupling 22 (22a to 22d), a ball nut 24 (24a to 24d) engaged with a threaded shaft 211, and a bearing rotatably supporting an end of the threaded shaft 211. Each of the drivers 23 is fixed to a support unit 28 (28a to 28d), which will be described later, provided on the base 46a.

The first movement mechanisms 21 constituting the pitch-varying unit 20 are connected with a control unit 30. The control unit 30 causes the drivers 23 of the first movement mechanisms 21 to operate individually. By the operation of the drivers 23, the threaded shafts 211 are rotated and the ball nuts 24 are moved in the X-axis direction. On the top face of each ball nut 24 is provided a slider 201 (201a to 201d) extending in the Y-axis direction. To the bottom side of each slider 201 are connected rail engagement members 27 provided on both guide rails 26. On each of the sliders 201 is placed a driver 311 (311a to 311d) of a second movement mechanism 31 to be described later. By the operation of the drivers 23, the ball nuts 24 and hence the sliders 201 are moved individually relative to the frame 42 in the X-axis direction.

As described above, since the engine testing device 1 according to the present embodiment includes a pitch-varying unit 20, the interval pitches between the seal heads 11 can be adjusted to fit the interval pitches of the intake ports and/or the exhaust ports of the engine E to be tested. By controlling the drivers 23 of the pitch-varying unit 20 individually, the interval pitches between the seal heads 11 can be made all equal and can be made all different.

The engine testing device 1 according to the present embodiment allows the positioning of each of the seal heads 11a, 11b, 11c, and 11d in the X-axis direction by means of the first movement mechanisms 21a, 21b, 21c, and 21d of the pitch-varying unit 20. Positioning the seal heads 11a, 11b, 11c, and 11d enables the adjustment of the interval pitches between the seal heads 11 disposed side by side to fit the port pitches of the engine E to be tested.

Embodiment 2

As illustrated in FIG. 1, the intake testing device 4 of the engine testing device 1 according to the present embodiment includes second movement mechanisms (forward/backward head movements unit) 31 to control the forward and backward movements of the seal heads 11 of the seal head unit 10.
(Control Unit 30)

In the intake testing device 4, the control unit 30 is connected with the servo motor 61 of a slide unit 60 to move the seal head unit 10 forward or backward relative to the engine E to be tested. Further, the control unit 30 is connected with the drivers 23 of the pitch-varying unit 20 of the seal head unit 10 to control the interval pitches between the seal heads 11. Further, the control unit 30 is connected with the drivers 310 to be described later of the second movement mechanisms 31 to control the forward and backward movements of the seal heads 11.

Figure 4:
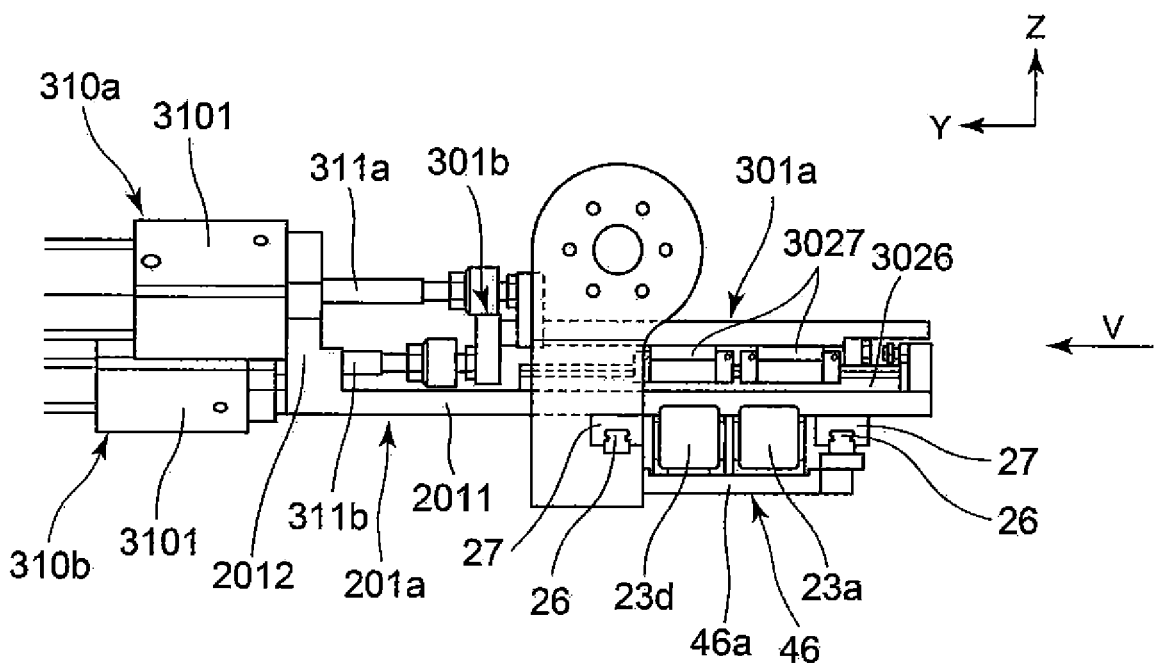
FIG. 4 is a side view illustrating the pitch-varying unit with second movement mechanisms mounted thereon.
Figure 5:
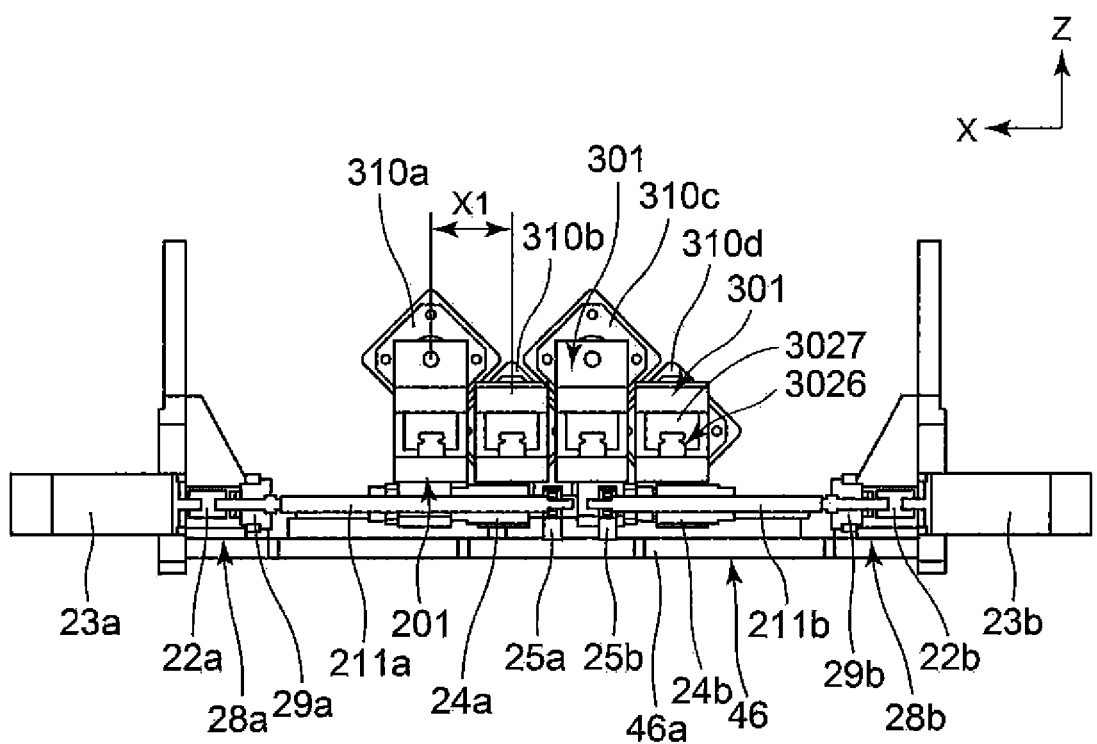
FIG. 5 is a view in the direction of the arrow V of FIG. 4.

As illustrated in FIG. 4 and FIG. 5, sliders 201 (201a to 201d) are respectively placed on the top faces of the ball nuts 24 of the pitch-varying unit 20, and the drivers 310 (310a to 310d) are respectively placed on the sliders 201. Each of the sliders 201 includes a flat part 2011 and a protruding part 2012 provided at the opposite end of the flat part 2011 to the engine E (on the left in FIG. 4). Main bodies 3101 of the drivers 310 are fixed onto the protruding parts 2012. The drivers 310 respectively constitute second movement mechanisms 31 for the seal heads 11 constituting the seal head unit 10.

Each of the drivers 310 of the second movement mechanisms 31 includes a main body 3101 and a cylinder rod 311 (311a to 311d) movable forward and backward relative to the main body 3101. The drivers 310a to 310d are disposed alternatingly on different levels: the driver 310a and the driver 310c are disposed on the same higher level and the driver 310b and the driver 310d are disposed on the same lower level in the Z-axis direction (vertical direction). As illustrated in FIG. 5, the drivers 310 disposed alternatingly on different levels allow the disposition pitch X1 of the drivers 310 to be reduced compared with drivers disposed adjacently on the same level. In other words, as the drivers 310 are disposed closer to each other, the total width of the second movement mechanisms 31 in the X-axis direction is reduced.

Sliders 301 (301a to 301d) are respectively connected to the ends of the cylinder rods 311. Similarly to the sliders 201, the sliders 301 have a bended form like letter L and include a flat part and a protruding part. On flat parts of the sliders 301 are respectively placed the seal heads 11. On the top face of each slider 201 is provided at least one guide rail 3026 extending in the Y-axis direction. On the bottom face of each slider 301 are provided at least two rail engagement members 3027 that slide on the corresponding guide rail 3026.

With these structures, the sliders 301 are moved forward or backward along the guide rails 3026 in accordance with forward or backward movements of the cylinder rods 311. As a result, the seal heads 11 constituting the seal head unit 10 can be individually moved forward or backward. Therefore, irrespective of whether the multi-cylinder engine E to be tested has three, four, five, or any other number of cylinders, the engine E can be tested by adjusting the number of the drivers 310 operated to fit the number of the cylinders. Note that in the present embodiment a case has been described in which the drivers 310 are individually operated but the invention is not limited thereto. For example, when engines E of a single type are to be tested, the number of cylinders is constant and there is no need for providing an actuator for each driver 310 but one actuator may be provided for operating all the sliders 301 at the same time.

Embodiment 3

Figure 6:
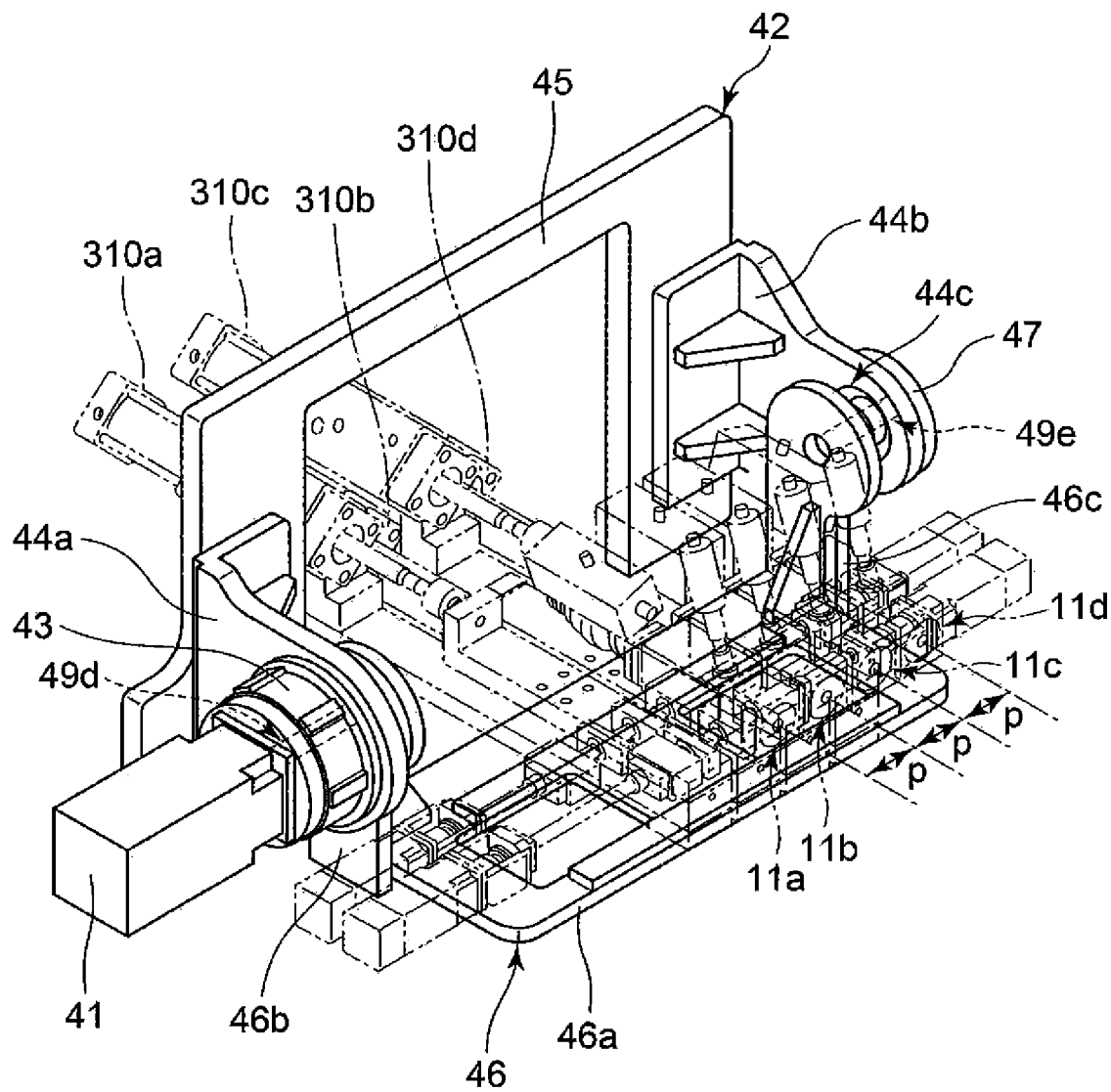
FIG. 6 is a perspective view illustrating the structure of the tilt unit of FIG. 1.

As illustrated in FIG. 6, the intake testing device 4 of the engine testing device 1 according to the present embodiment includes at least one tilt unit 40 tiltably supporting the seal head unit 10. In other words, the tilt unit 40 tiltably moves the seal head unit 10, the above-described pitch-varying unit 20, and the second movement mechanisms (forward/backward head movements unit) 31. The tilt unit 40 includes a frame 42 swingably supporting the seal head unit 10, the pitch-varying unit 20, and the second movement mechanisms 31, and a tilt actuator 41 to tilt a movable member to be described later. The tilt actuator 41 is connected with the above-described control unit 30.
(Tilt Unit 40)

As illustrated in FIG. 6, the frame 42 constituting the tilt unit 40 has a basic structure including a fixed member 45 in the shape of reversed letter U, a pair of brackets 44a, 44b provided for the fixed member 45 and each including an opening 44c, a movable member 46 (base 46a, left support 46b, right support 46c) swingably attached to the pair of brackets 44a, 44b. The pitch-varying unit 20 and the second movement mechanisms (forward/backward head movements unit) 31 are mounted on the top face of the base 46a. The tilt actuator 41 is fixed to the bracket 44a (or 44b). The fixed member 45 and the brackets 44a, 44b are in the fixed system while the movable member 46 is in the movable system.

The left support 46b and the right support 46c respectively include an axle member 49d and an axle member 49e extending outward. The axle member 49d and the axle member 49e are inserted to the openings 44c of the brackets 44a and 44b, respectively. The pair of brackets 44a, 44b are respectively provided with ring members 47, 47 on their outer sides (the ring member on the bracket 44a is not illustrated) and each ring member 47 has a hole 472, in which a bearing 474 is provided. These bearings 474 pivotally support the axle members 49d, 49e and hence the movable member 46. One of the axle member 49d (or 49e) is connected with reduction gears 43, which are connected with a tilt actuator 41.

Activating the tilt actuator 41 rotates the axle member 49d to swing the movable member 46 upward and downward within a certain range of angles around the axle members 49d, 49e serving as rotational axis. Thus the tilt unit 40 is tilted.

Figure 7:
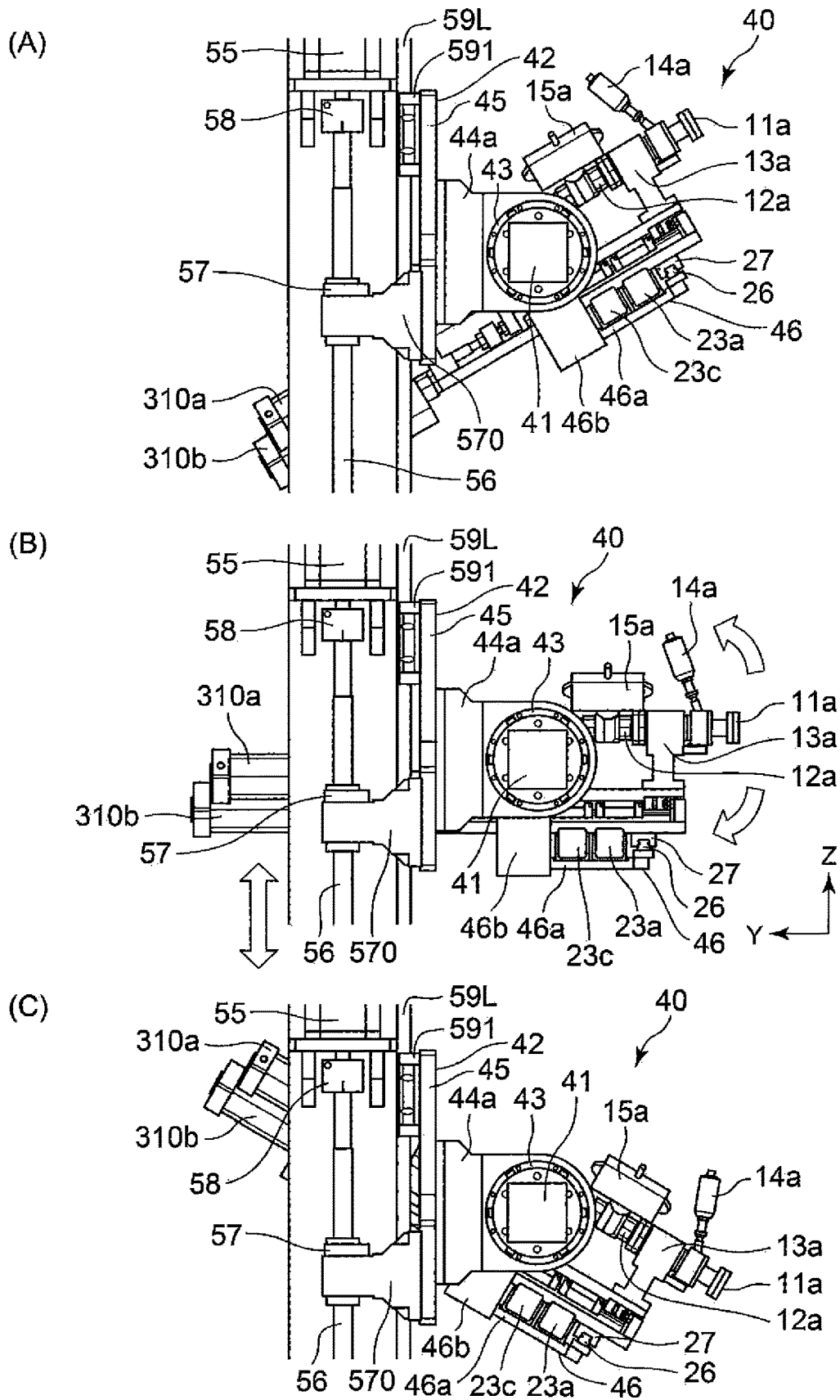
FIG. 7 is a left side view of FIG. 6.

The range of angles at which the tilt unit 40 is allowed to swing is not limited as long as there is no interference between the fixed member 45 and any one of the movable member 46, the pitch-varying unit 20, and second movement mechanism 31 during the tilting operation. For example, as illustrated in FIG. 7, the range may be between 30° upward in the Z-axis direction (FIG. 7 (A)) and −30° downward in the Z-axis direction (FIG. 7 (C)), taking the position in which the base 46a of the tilt unit 40 is horizontal (FIG. 7 (B)) as the reference position (0°).

Figure 8:
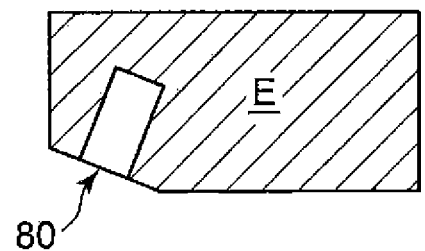
FIGS. 8A, 8B, and 8C are partial cross section diagrams illustrating orientations of the openings of intake ports/exhaust ports (inclination angles) of the engine E.
Figure 8:
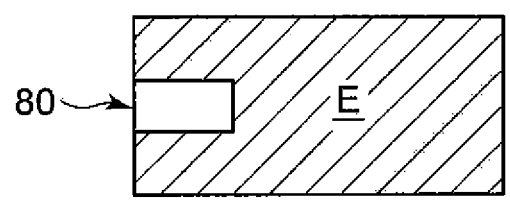
Figure 8:
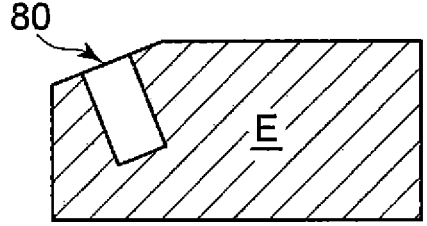

As illustrated in FIG. 8, the orientations of the openings of the intake ports/exhaust ports (inclination angles) of engines E all vary depending on the specifications for the engines E. The engine E on the top, illustrated in FIG. 8 (A), has downwardly oriented openings 80 of the intake ports/exhaust ports in a lower part of the engine E. To test this engine E, the tilt unit 40 is operated for causing an upward tilt in the Z-axis direction. The engine E in the middle, illustrated in FIG. 8 (B), has horizontally oriented openings 80 of the intake ports/exhaust ports on a side of the engine E. To test this engine E, the tilt unit 40 is not operated for causing any tilt and maintains a horizontal posture. The engine E on the bottom, illustrated in FIG. 8 (C), has downwardly oriented openings 80 of the intake ports or the exhaust ports in an upper part of the engine E. To test this engine E, the tilt unit 40 is operated for causing a downward tilt in the Z-axis direction. Thus, the engines E to be tested by the engine testing device may be of various types and have various positions and orientations (inclination angles) for the intake ports/exhaust ports. Besides, the intake ports/exhaust ports of the engine E may extend to the inside of the engine in various lengths.

By operating the tilt unit 40 to tilt the movable member 46, the engine testing device 1 according to the present embodiment can swing the seal head unit 10. Since the seal head unit 10 is mounted on the base 46a constituting the movable member 46, the seal heads 11 of the seal head unit 10 can be positioned at any inclination angle by controlling the tilt angle of the base 46a to fit the specification of the engine E to be tested.

Embodiment 4

The engine testing device 1 includes an elevator unit 50 to move the tilt unit 40 upward and downward in the Z-axis direction (vertical direction). Since the tilt unit 40 includes the seal head unit 10, the pitch-varying unit 20, and the second movement mechanisms 31, these units are moved upward and downward in the Z-axis direction (vertical direction) by the operation of the elevator unit 50 for causing the upward and downward movements in the Z-axis direction (vertical direction).

Figure 9:
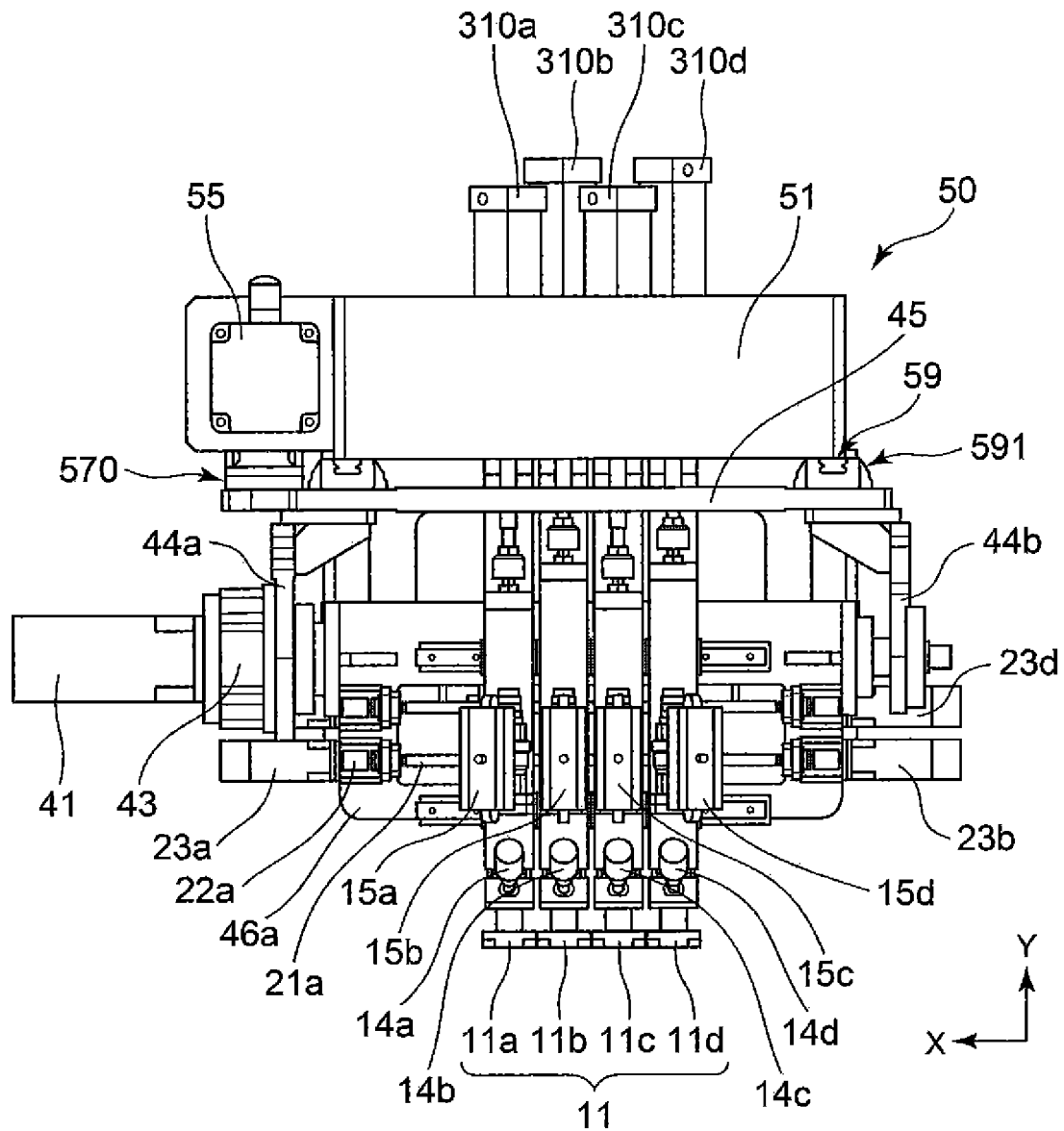
FIG. 9 is a top view of FIG. 1.
Figure 11:
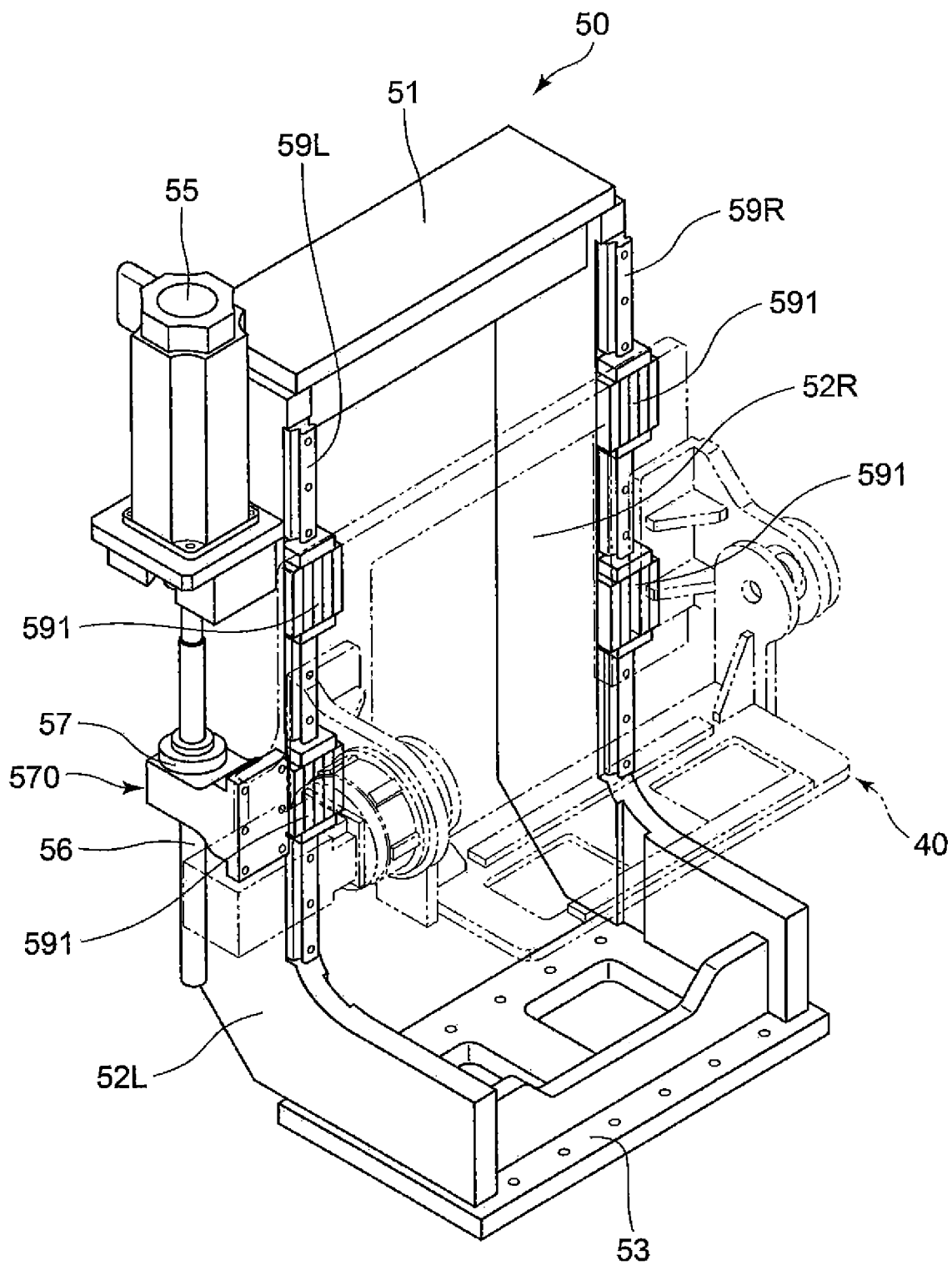
FIG. 11 is a perspective view illustrating the structure of the elevator unit.

As illustrated in FIGS. 9 and 11, the elevator unit 50 includes a frame top 51, frame sides 52L, 52R in the shape of letter L, a frame base 53 fixed to the leg portions of the frame sides 52L, 52R, and a servo motor 55. The servo motor 55 is fixed to one of the frame sides 52L (or 52R).

Figure 10:
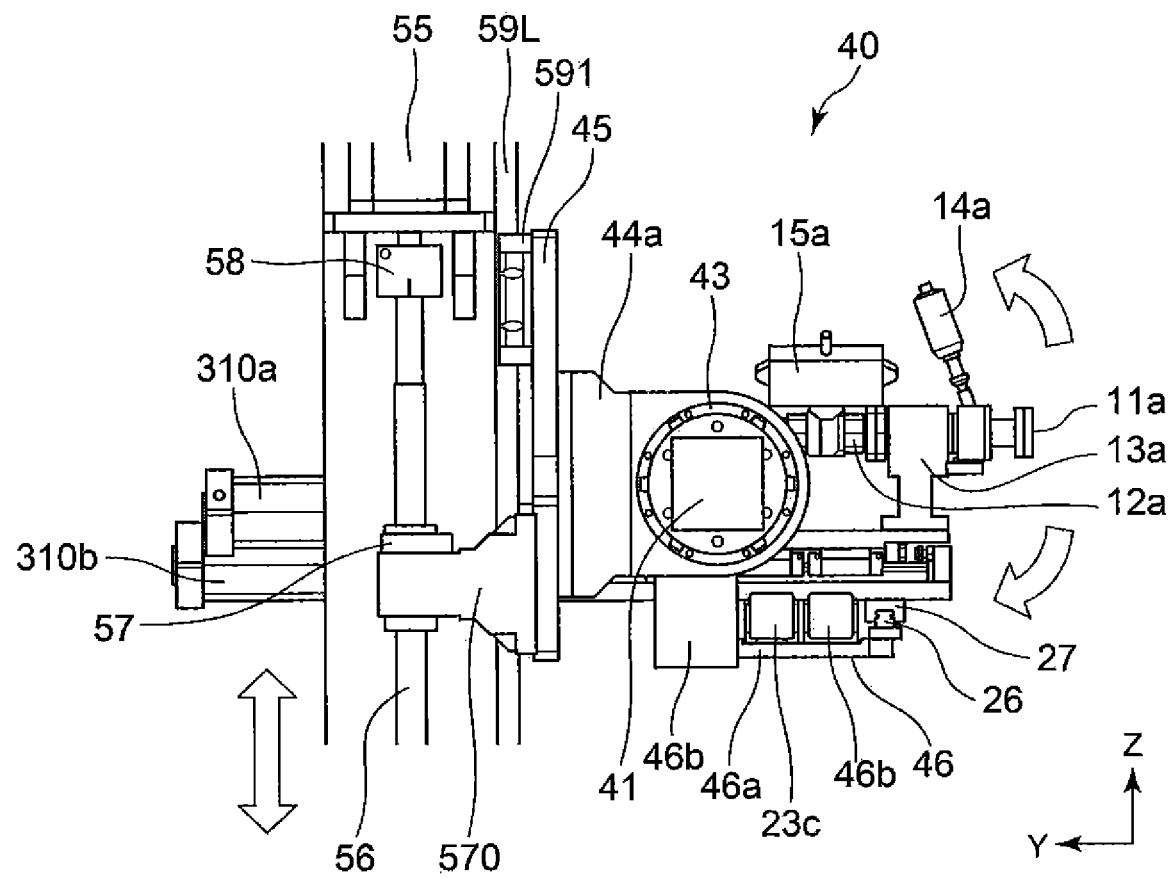
FIG. 10 is a left side view illustrating the structure of the tilt unit.

As illustrated in FIG. 10, the servo motor 55 is connected with a threaded shaft 56 by means of a coupling 58. The threaded shaft 56 extends in the Z-axis direction and engages with a ball nut 57. The ball nut 57 is connected with a coupling member 570. The coupling member 570 is fixed to the back side of the fixed member 45 of the tilt unit 40. By the rotation of the servo motor 55, the threaded shaft 56 is rotated to move the ball nut 57 upward and downward in the Z-axis direction (vertical direction). As a result, the coupling member 570 is moved upward and downward with the ball nut 57, and the tilt unit 40 (fixed member 45) is thereby moved upward and downward in the Z-axis direction (vertical direction).

Figure 12:
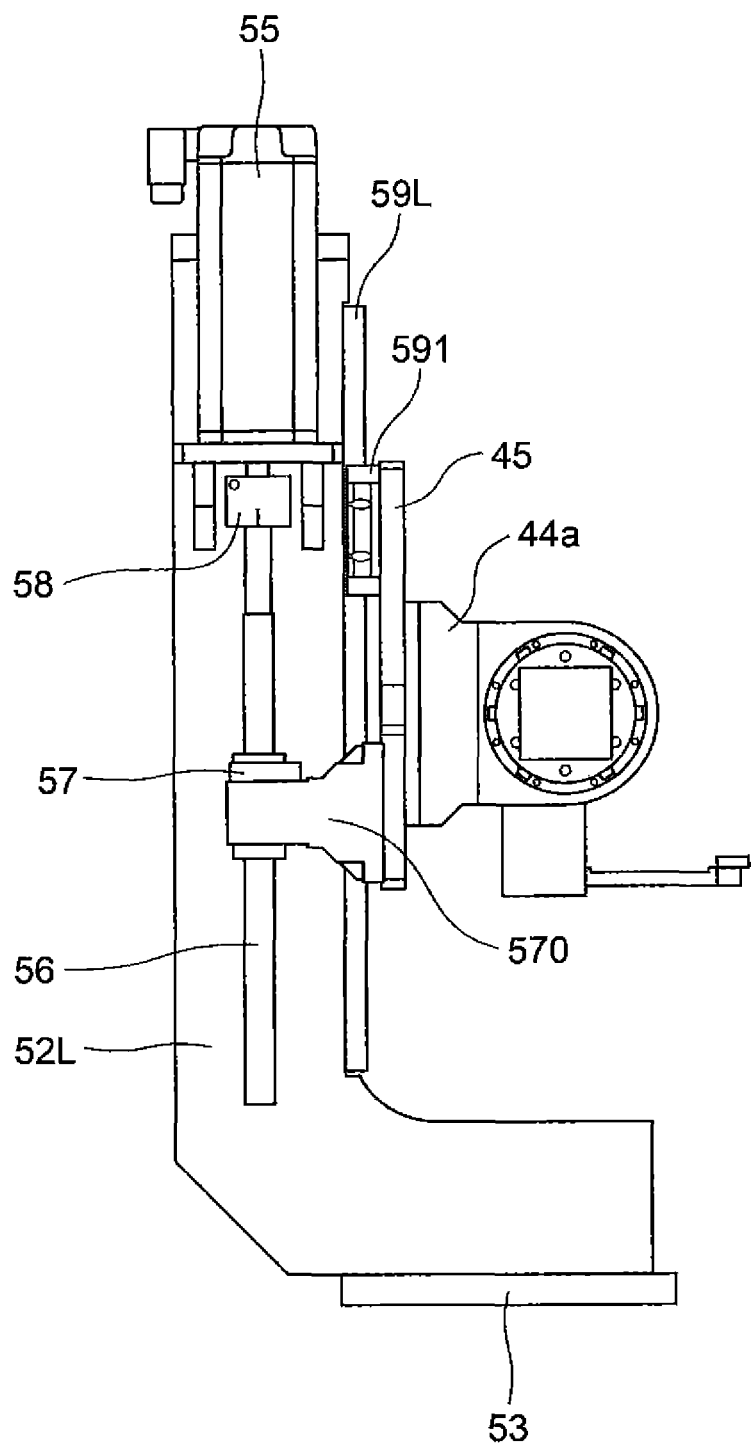
FIG. 12 is a left side view illustrating the structure of the elevator unit.
Figure 13:
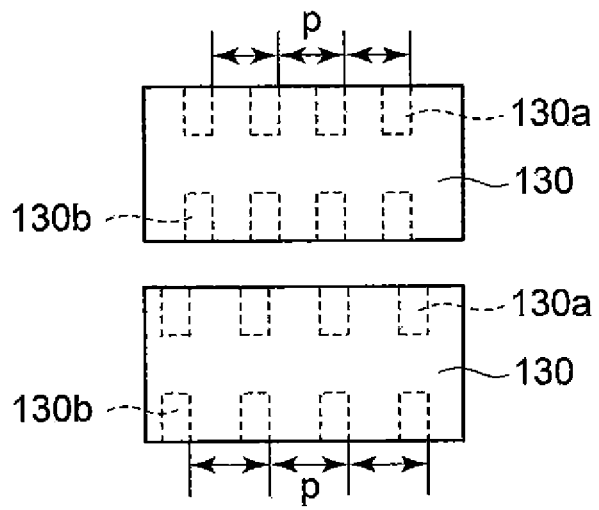
FIGS. 13A and 13C are diagrams in a plan view illustrating structures of multiple types of engines to be tested.
FIG. 13B illustrates, in partial cross section diagrams, structures of multiple types of engines to be tested.
Figure 13:
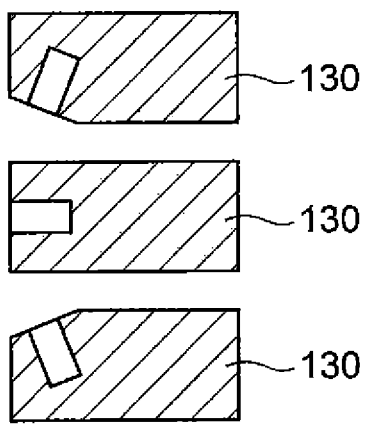
Figure 13:
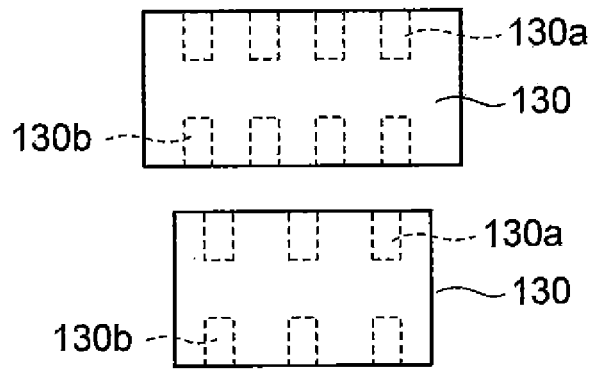

The frame sides 52L and 52R are provided with guide rails 59 (59L, 59R) respectively on their front sides (sides toward the engine), the guide rails each extending in the Z-axis direction (vertical direction). Each of the guide rails 59 engages with two rail engagement members 591. As illustrated in FIG. 12, the rail engagement members are fixed to the back side of the fixed member 45. When the servo motor 55 rotates to move the coupling member 570 and hence the fixed member 45b upward and downward, their movements are guided by the guide rails 59 and the rail engagement members 591.

The engine testing device 1 according to the present embodiment can freely control the position of the seal head unit 10 in the vertical direction relative to the engine E by using the elevator unit 50. The elevator unit 50 controls the vertical position of the seal head unit 10 to fit the vertical positions of the intake ports/exhaust ports of the engine E.

As described above, since the engine testing device according to the present invention includes the pitch-varying unit 20, it is possible to control the interval pitches between the seal heads 11 disposed side by side to fit the specification of the engine E to be tested. Further, since the engine testing device according to the present invention includes the second movement mechanisms 31, it is possible to move the seal heads 11 forward and backward individually. Further, since the engine testing device according to the present invention includes the tilt unit 40, it is possible to control the tilt angle of the seal head unit 10 to fit the inclination angles of the openings of the intake ports/exhaust ports and the positions of the openings of the intake ports/exhaust ports of the engine E to be tested. Further, since the engine testing device according to the present invention includes the elevator unit 50, it is possible to control the vertical position of the seal head unit 10 to fit the positions of the openings of the intake ports/exhaust ports of the engine E.

The engine testing device according to the present invention can be applied to multiple types of engines. In the present invention, the engines to be tested are not limited in terms of the number of cylinders, disposition of cylinders, or the like. The engines to be tested may be three-cylinder engines, four-cylinder engines, six-cylinder engines, eight-cylinder engines, or the like, and may be multiple types of engines such as gasoline engines, diesel engines, and the like. Nor are the engines to be tested limited in terms of design specifications such as positions of the openings of the intake ports/exhaust ports, pitches between the intake ports/exhaust ports, orientations of the openings of the intake ports/exhaust ports (inclination angles) or the like.

Although embodiments of carrying out the present invention have been described above, the present invention is not limited to the above-described embodiments and any alterations of conditions and the like without departing from the spirit of the present invention are within the range of application of the present invention.

INDUSTRIAL APPLICABILITY

As described above, the engine testing device according to the present invention, capable of testing multiple types of engines, is expected to be used, in particular, as an engine testing device to carry out an engine motoring test on an automated assembly line regardless of interval pitches between the intake ports/exhaust ports and the like of the engines to be tested. The engine testing device according to the present invention may be used in particular in the automobile industry as well as ship building, agriculture, construction and other various industries.

REFERENCE SIGNS LIST 1 engine testing device
2 conveyer device
3 drive unit
4 intake testing device
5 exhaust testing device
10 seal head unit
11a to 11d seal heads
20 pitch-varying unit
21a to 21d first movement mechanisms
211a to 211d threaded shafts
23a to 23d drivers
24a to 24d ball nuts
30 control unit
31a to 31d second movement mechanisms
310a to 310d drivers
40 tilt unit
41 tilt actuator
42 frame
44 bracket
45 fixed member
46 movable member
47 ring member
50 elevator unit
51 frame top
52L, 52R frame sides
55 servo motor
58 coupling
59L, 59R guide rails

The invention claimed is:

1. An engine testing device configured to test an engine with a plurality of ports including intake ports and exhaust ports in a pseudo driving state, the engine testing device comprising:
a plurality of seal head units movable forward and backward relative to the intake ports and the exhaust ports of the engine, each of the seal head units including a plurality of seal heads disposed side by side and connectable to respective ports of the intake ports and the exhaust ports;
at least one pitch-varying unit for at least one of the seal head units to change interval pitches between each adjacent pair of the seal heads of the seal head unit; and
the at least one pitch-varying unit comprises:
a plurality of first movement mechanisms respectively connected with the seal heads and movable in a direction in which the seal heads are disposed side by side; and
a plurality of drivers to respectively drive the first movement mechanisms.

2. The engine testing device according to claim 1, wherein the first movement mechanisms comprise ball nuts and threaded shafts,
wherein each of the seal heads is connected one of the ball nuts,
wherein each of the ball nuts engages with one of the threaded shafts, and
wherein each of the threaded shafts is connected with one of the drivers and the drivers rotate the threaded shafts.

3. The engine testing device according to claim 1, further comprising second movement mechanisms respectively provided for the seal heads of at least one of the seal head units to respectively support the seal heads to enable the seal heads to move forward and backward.

4. The engine testing device according to claim 3, wherein the first movement mechanisms comprise ball nuts and threaded shafts,
wherein each of the seal heads is connected one of the ball nuts,
wherein each of the ball nuts engages with one of the threaded shafts, and
wherein each of the threaded shafts is connected with one of the drivers and the drivers rotate the threaded shafts.

5. The engine testing device according to claim 1, further comprising at least one tilt unit for tiltably supporting at least one of the seal head units, wherein the at least one tilt unit comprises:
a frame swingably supporting the seal head unit; and
a tilt actuator provided on the frame to tilt the seal head unit relative to the frame.

6. The engine testing device according to claim 5, further comprising second movement mechanisms respectively provided for the seal heads of at least one of the seal head units to respectively support the seal heads to enable the seal heads to move forward and backward.

7. The engine testing device according to claim 5, wherein the first movement mechanisms comprise ball nuts and threaded shafts,
wherein each of the seal heads is connected one of the ball nuts,
wherein each of the ball nuts engages with one of the threaded shafts, and
wherein each of the threaded shafts is connected with one of the drivers and the drivers rotate the threaded shafts.

8. The engine testing device according to claim 1, further comprising a control unit to control forward and backward movements of the plurality of seal head units and a driving operation by each of the drivers of the at least one pitch-varying unit.

9. The engine testing device according to claim 8, wherein the first movement mechanisms comprise ball nuts and threaded shafts,
wherein each of the seal heads is connected one of the ball nuts,
wherein each of the ball nuts engages with one of the threaded shafts, and
wherein each of the threaded shafts is connected with one of the drivers and the drivers rotate the threaded shafts.

10. The engine testing device according to claim 8, further comprising at least one tilt unit for tiltably supporting at least one of the seal head units, wherein the at least one tilt unit comprises:
a frame swingably supporting the seal head unit; and
a tilt actuator provided on the frame to tilt the seal head unit relative to the frame.

11. The engine testing device according to claim 10, wherein the first movement mechanisms comprise ball nuts and threaded shafts,
wherein each of the seal heads is connected one of the ball nuts,
wherein each of the ball nuts engages with one of the threaded shafts, and
wherein each of the threaded shafts is connected with one of the drivers and the drivers rotate the threaded shafts.

12. The engine testing device according to claim 8, further comprising second movement mechanisms respectively provided for the seal heads of at least one of the seal head units to respectively support the seal heads to enable the seal heads to move forward and backward.

13. The engine testing device according to claim 12, wherein the first movement mechanisms comprise ball nuts and threaded shafts,
   wherein each of the seal heads is connected one of the ball nuts,
   wherein each of the ball nuts engages with one of the threaded shafts, and
   wherein each of the threaded shafts is connected with one of the drivers and the drivers rotate the threaded shafts.

14. The engine testing device according to claim 12, further comprising second movement mechanisms respectively provided for the seal heads of at least one of the seal head units to respectively support the seal heads to enable the seal heads to move forward and backward.

15. The engine testing device according to claim 14, wherein the first movement mechanisms comprise ball nuts and threaded shafts,
   wherein each of the seal heads is connected one of the ball nuts,
   wherein each of the ball nuts engages with one of the threaded shafts, and
   wherein each of the threaded shafts is connected with one of the drivers and the drivers rotate the threaded shafts.

\* \* \* \* \*